Patented Dec. 22, 1936

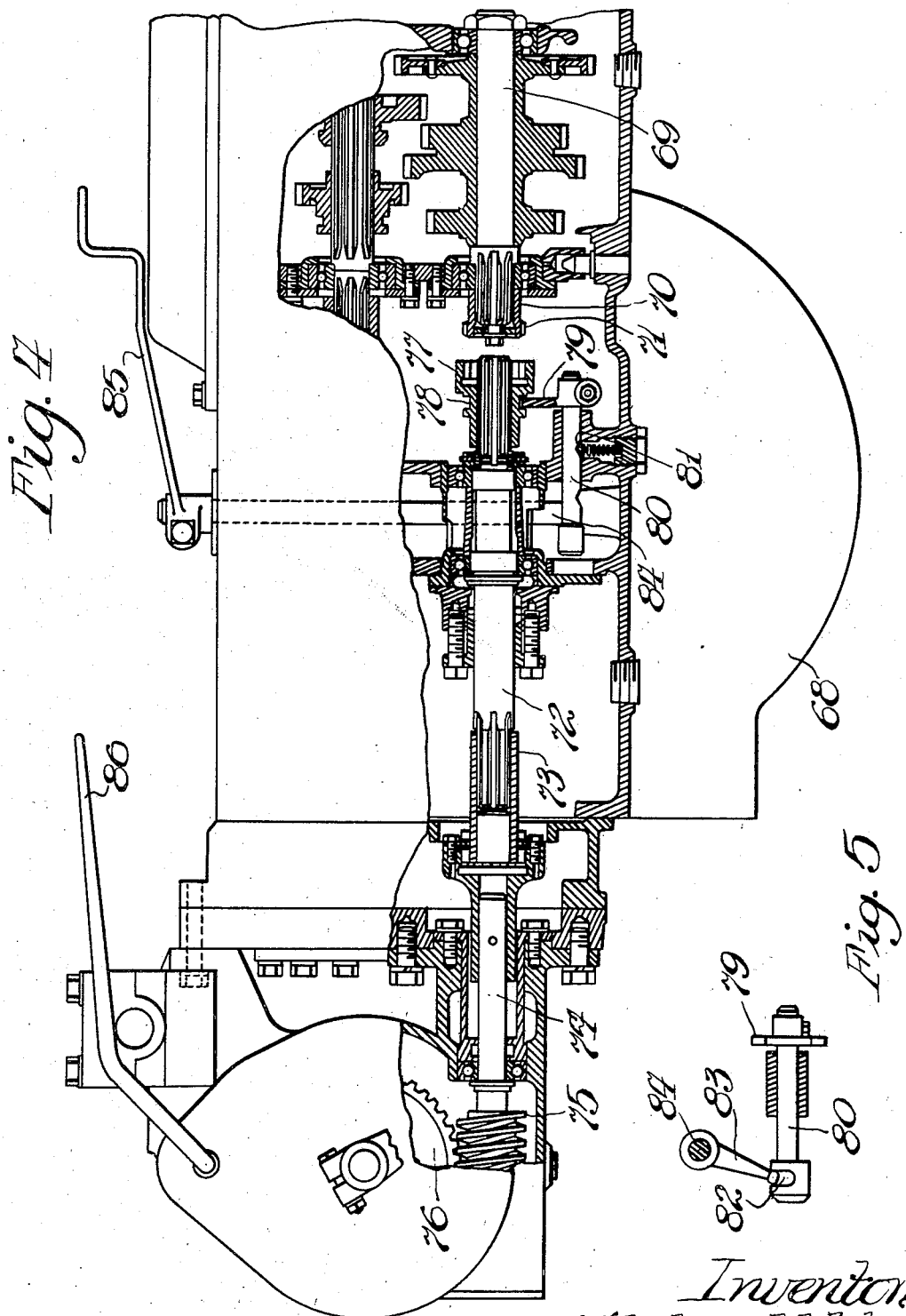

2,065,139

UNITED STATES PATENT OFFICE 2,065,139

POWER LIFT MECHANISM

Alexus C. Lindgren, Chicago, and David B. Baker, Riverside, Ill., assignors to International Harvester Company, a corporation of New Jersey Application November 30, 1932, Serial No. 644,982
Renewed January 14, 1935

13 Claims. (Cl. 97—50)

This invention relates to a power lift attachment for tractors.

A principal object of the invention is to provide a power lift device of novel and improved construction.

Another object is to provide a power lift unit designed as an auxiliary attachment adapted to be used on well known types of tractors, where it can be utilized to advantage for operating a rock shaft mounted transversely of the tractor.

Another object is to provide and position a power lift device on the rear axle housing of a tractor in position to receive power from a drive shaft connected to the tractor drive mechanism and extending rearwardly therefrom.

Another object is to provide a power lift device which is self contained in a unitary housing and which embodies a slip clutch mechanism to prevent overload and an in-and-out-of-gear device to reduce the wear from moving parts to a minimum.

These and other objects which will be apparent from the detailed description to follow, are accomplished by constructions as shown in the drawings, in which.

Figure 4 shows a portion of the rear end of a tractor of the track laying type, such as shown in Patent No. 1,932,108, October 24, 1933, to Johnston et al. Certain portions of this figure are broken away in section to show a driving means extending from the tractor transmission to the mechanism of the power lift device mounted at the rear of the housing which contains the tractor driving mechanism; and Figure 5 is an enlarged detail showing the device in the machine shown in Figure 4 for throwing the power lift drive out of gear.

Figure 1:
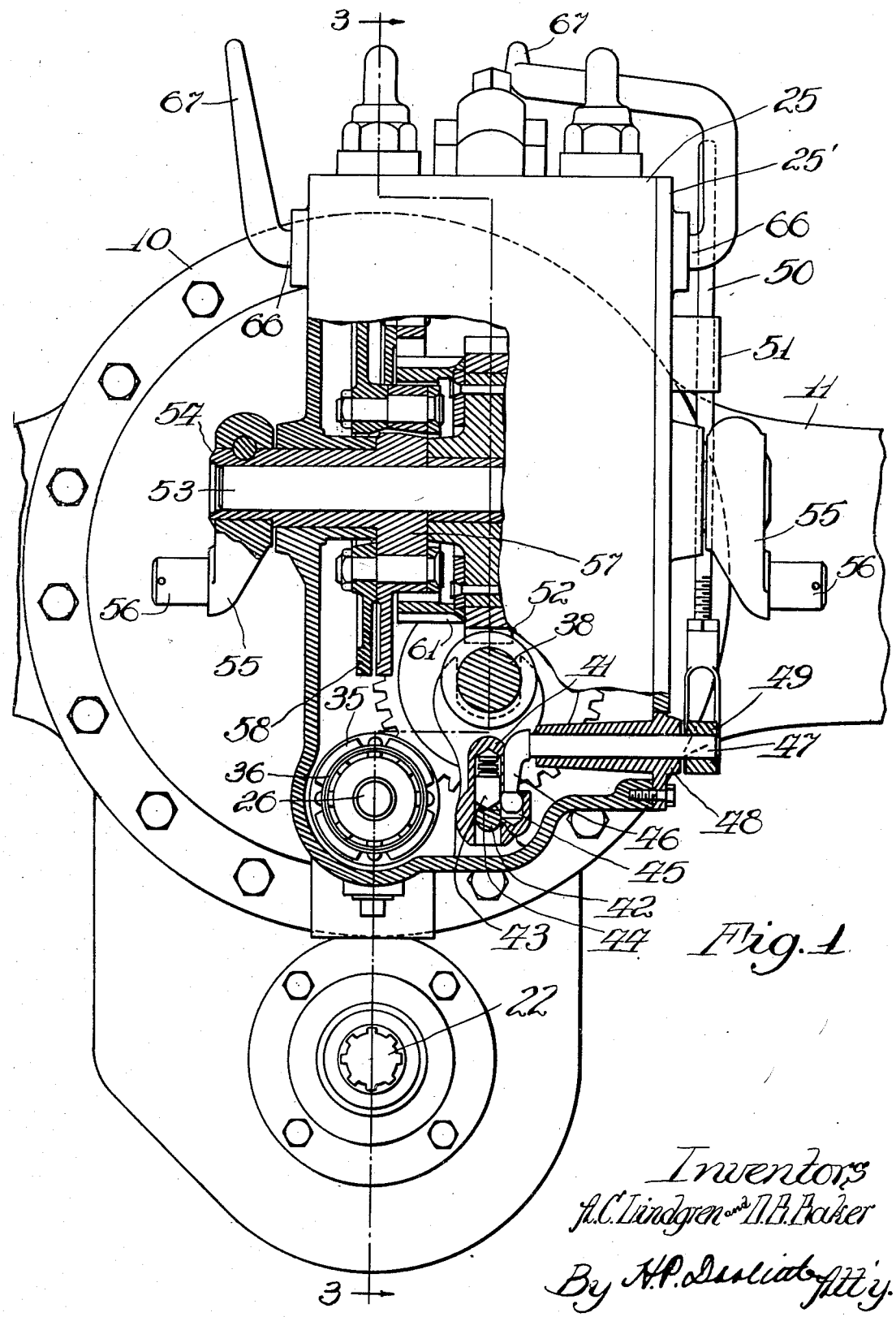
Figure 1 is a rear view of one embodiment of the invention attached to the differential and rear axle housing of a conventional type of tractor. A portion of the power lift casing is broken away to show the novel features of the device.
Figure 2:
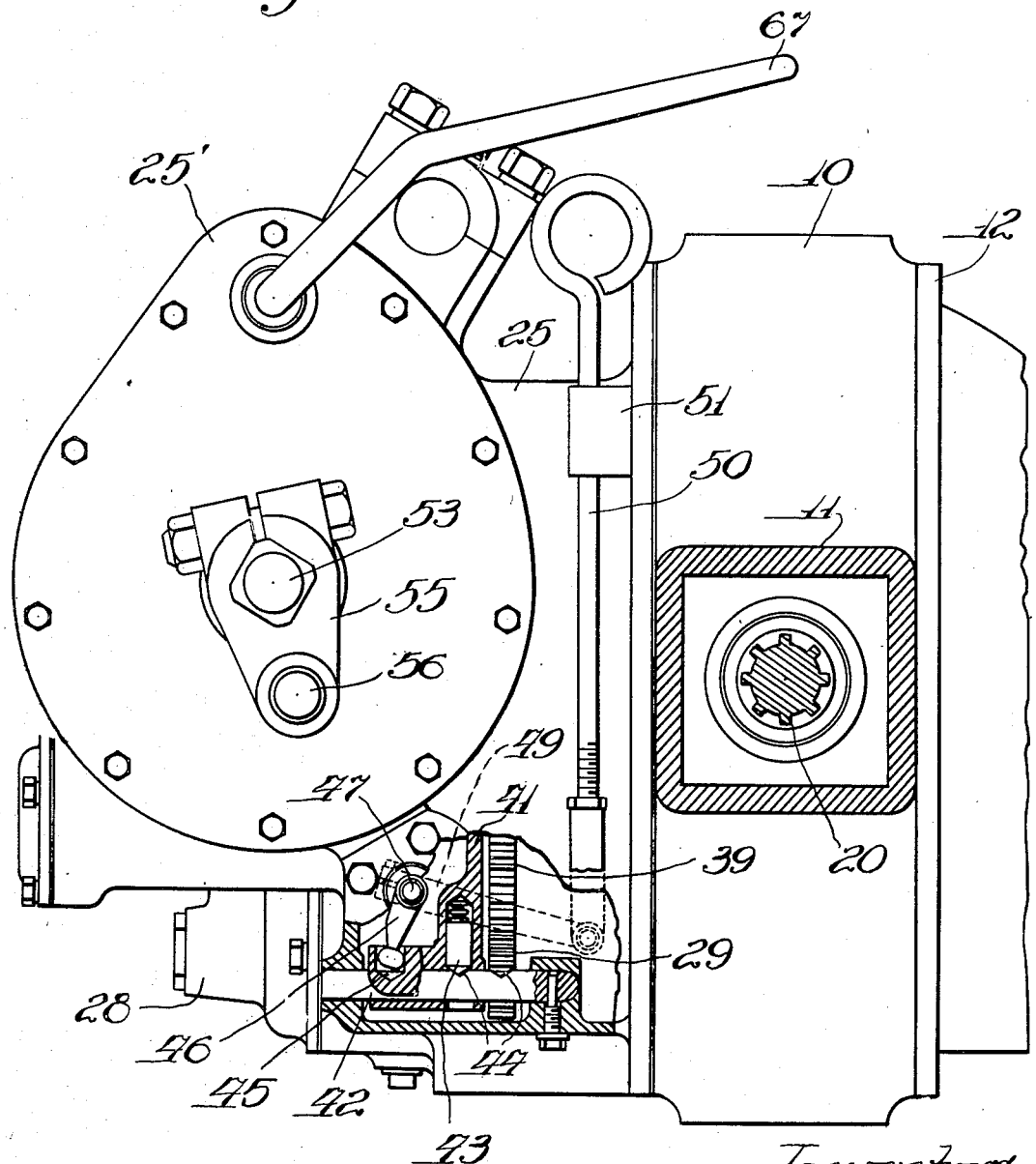
Figure 2 is a sectional view through the rear axle housing of the tractor, showing the differential housing and a power lift device embodying the invention mounted thereon. A portion of this figure is also broken away to show the in-and-out-of-gear mechanism.
Figure 3:
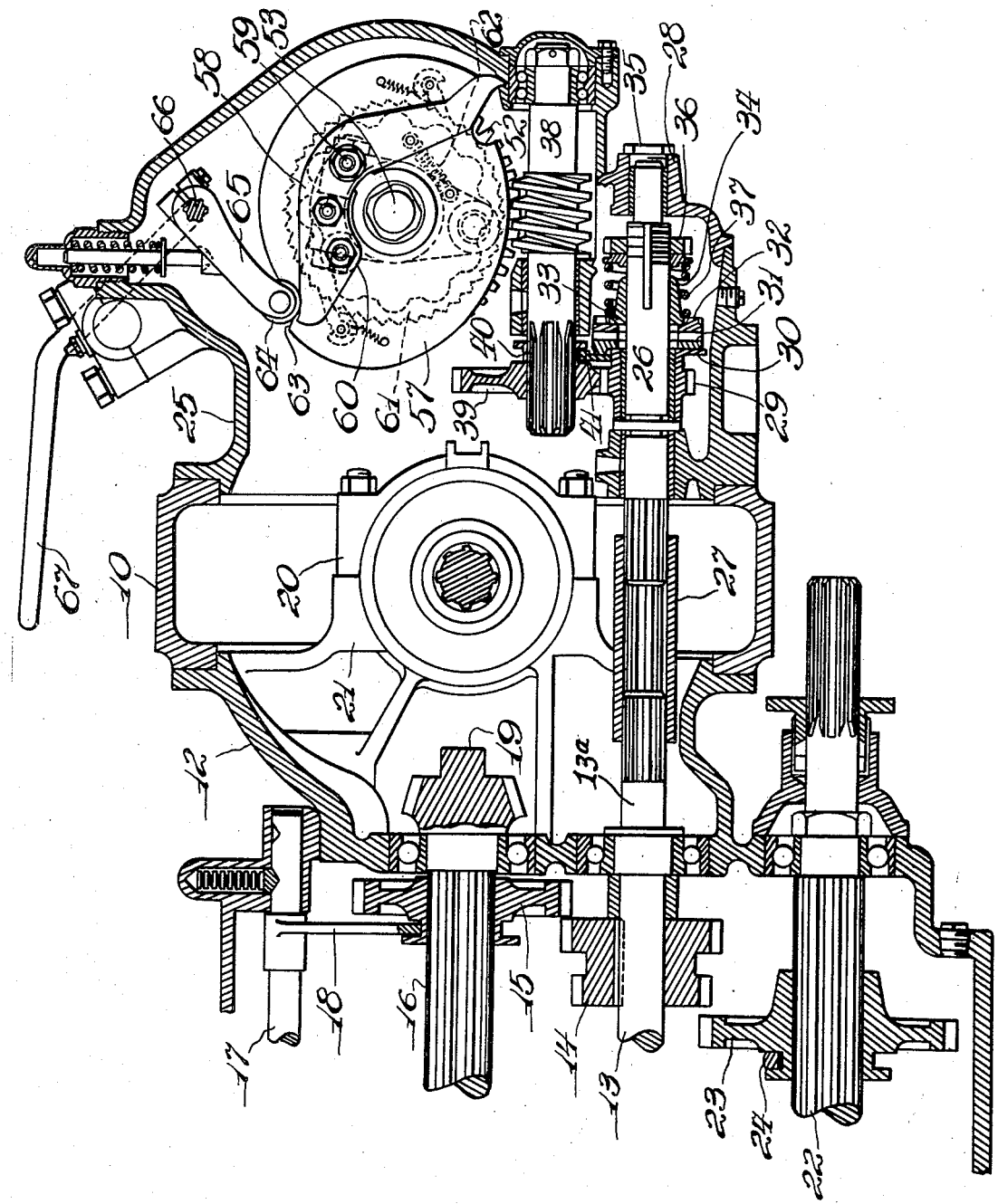
Figure 3 is a sectional view taken on the line 3—3 of Figure 1. This figure shows a portion of the conventional transmission in order to illustrate the driving means for the power lift mechanism and for a power takeoff shaft positioned below the power lift mechanism.

The embodiment of the invention shown in Figures 1, 2, and 3 is particularly constructed for a well known type of tractor, as shown in Patent No. 1,667,371, April 24, 1928, which has a transverse rear axle construction including a final drive or central housing 10 and axle housings 11, extending laterally therefrom. The central portion of the housing is secured to the transmission housing 12, which extends forwardly therefrom. Said housings contain the transmission for driving the tractor and the differential or final drive. This transmission may be of any conventional construction and only certain portions of it are shown in the drawings. The shaft 13 is the main transmission shaft which receives power from the tractor engine. In order to provide a drive shaft for the lift mechanism, shaft 13 is provided with an extension 13ª constituting a supplemental drive shaft, the free end of which is splined and located within the central housing. By means of gears such as 14, shown rigidly mounted on said shaft 13 and gears such as 15, slidably mounted on the shaft 16, selective gear ratios are obtained for driving the shaft 16 at different speeds relative to the shaft 13. A slidable rock shaft 17, carrying actuating lever arms such as the arm 18 illustrated, provides means for selectively engaging the different gears. The shaft 16 carries a pinion 19 which is adapted to operatively engage a ring gear, not shown, which is mounted on a conventional differential assembly. As Figure 3 is taken on a section line looking away from the side at which the ring gear is positioned, it does not show. However, this construction is of the conventional type used on all automotive vehicles. The axles 20, which are driven from the differential, are mounted at their inner ends in supporting bearings which are carried on extensions 21 from the transmission housing. As previously mentioned, all of this construction, with the exception of the supplemental drive shaft 13ª is of a conventional nature and has not been shown in detail as it does not constitute any part of the present invention.

In the transmission casing below the shaft 13 a power takeoff shaft 22 is rotatably mounted in bearings positioned in the walls of the transmission housing. A driving gear 23, slidably and non-rotatably mounted on the shaft 22, is engageable with the gear 14 on the shaft 13. Suitable means, including a yoke 24, are provided for engaging these gears and thereby driving the power takeoff shaft 22. Said shaft extends rearwardly beyond the transmission casing and provides means for obtaining power for any desired purpose independent of the operation of the power lift device.

The power lift mechanism is contained in an auxiliary housing or casing 25 which is provided with an annular attaching flange for securing the casing to the rear of the banjo housing 10 in place of the usual cover plate. The auxiliary housing or casing 25, as it will be designated, is secured to the central housing 10 by a plurality of cap screws. A gasket is utilized in order to obtain an oil tight joint. It is to be understood that the casing 25 is open on its forward side whereby grease or oil from the differential is thrown into the power lift casing, thereby lubricating the mechanism contained therein.

At the lower side of the casing 25 bearings are formed for a drive shaft 26 which is positioned in axial alignment with the drive shaft 13ª. The two shafts are splined at their adjacent ends and an internally splined sleeve 27 is slipped over the ends of the shafts to provide a driving connection therebetween. The inner bearing for the shaft 26 is provided by an integral upward extension of the casing 25 at its inner side adjacent the banjo housing 10. The outer bearing for said shaft is formed by a cap 28 which is rigidly secured to the casing 25 in an oil tight manner. This cap is provided for gaining access to the shaft 26 for a reason which will be hereinafter described.

A drive gear 29 is rotatably mounted on the shaft 26 and is held against axial movement with respect thereto by an abutment with a thrust washer positioned adjacent the extension which forms the inner bearing for the shaft 26. At its other end the gear 29 has an extension on which a lateral flange 30 is formed. Said flange is apertured to receive the driving lugs of a clutch member 31. Said member is annular in form and in addition to being provided with the lugs for engaging the flange 30, is provided on the opposite axial face with a plurality of ratchet-like engaging portions. A similar clutch member 32 reversed in position with respect to the member 30, engages said member. The driving lugs of the clutch member 32 are fitted in apertures formed in a flange 33 which is part of a member 34 having a hub non-rotatably and slidably mounted on the shaft 26. This movement is provided for by a splined connection between the hub and shaft. A thrust member 35 is also mounted on the shaft 26 non-rotatable and slidable with respect thereto. An adjusting nut 36 threaded on the end of the shaft 26, engages the thrust member 35 and adjustably holds it in position. A compression spring 37 abuts against the flange 33 and the thrust member 35, thereby holding the clutch members 31 and 32 resiliently in engagement.

Above the shaft 26 and laterally with respect thereto, in order to permit the use of a larger gear, a shaft 38 is rotatably mounted against axial movement in bearings carried by the casing 25. The shaft 38 is splined at its forward end and a gear 39 is mounted thereon for axial movement with respect to the shaft. Said gear is of a size which meshes with the gear 29 on the shaft 26. An in-and-out-of-gear arrangement is provided for engaging and disengaging the gear 39. A thrust collar 40 is formed as an integral part of the gear 39. A gear shifter fork 41, which engages said collar, is slidably mounted on a shaft 42 rigidly mounted in the lower part of the casing parallel with respect to the shaft 38. A spring pressed latch 43 mounted in a bore or recess formed in the fork 41, engages notches 44 formed in the shaft 42 to maintain the fork in either of its two positions. A recess 45 is formed on the upper side of a horizontal extension of the fork 41. The rounded end of a lever arm 46 loosely fits into said recess. The lever arm 46 is rigidly secured to a transverse shaft 47 rotatably mounted in a bearing 48 formed as a part of the casing 25. The shaft 47 extends outside the casing and a lever 49 is rigidly secured thereto. A gear shifter rod 50 pivoted to the outer end of the lever 49, which extends substantially horizontally, is held in a substantially upright position by a bracket 51 formed on the casing 25 adjacent the banjo housing 10. Said rod is formed at its upper end with a loop whereby it may be easily engaged by the operator.

The shaft 38 is provided with a worm which operatively engages a worm wheel 52. Said worm wheel is mounted on a hub which is freely rotatable on a lifting shaft 53 extending transversely through the casing 25 and rotatable with respect thereto. Although the particular construction of the power lift mechanism shown, which is of the half revolution type, is not the subject matter of this invention, such portions as will be necessary to clearly illustrate the novel features of this invention have been shown in the drawings. The particular power lift mechanism is the subject matter of the copending application, Serial No. 540,142, filed May 26, 1931, by Lindgren et al. and patented May 30, 1933, No. 1,911,373.

The casing 25, which has heretofore been described as a unitary housing, is provided at one side with a cover plate 25' which is necessary to provide for assembling the device and for inspection and repairs. The shaft 53 is rotatably mounted at each end in sleeves 54 which are in turn rotatably mounted in hub-like portions of the casing 25 and the cover plate 25'. The sleeves 54 extend outside of the casing and provide means for attaching lifting arms 55. The arms 55 have cranks 56 extending therefrom to which the lifting levers or levers for operating rock shafts or other lifting means, are to be attached. This particular power lift construction is of the double lift type, the mechanism in each half of the casing being exactly the same in construction. It is, therefore, evident that only one unit of the mechanism need be described.

Within the casing the sleeve 54 carries an annular flange 57 on which a clutch actuating arm 58 is pivotally mounted by means of a pin 59. The flange 57 is formed peripherally with two eccentric or cammed portions which cooperate with the clutch actuating arm 58. A roller 60 is pivoted on the arm 58 in a position to engage the internally notched portion of a clutch member 61 secured to the worm wheel 52 for rotation therewith. A spring 62 is secured to the arm 58 and to the flange 57 in a position to hold the outer ends of the arm outward in a position over the smaller diameter portions of the flange 57. At the joining point of the large diameter portion of said cams and the small diameter portions of said cams a notch 63 is formed. A roller 64, mounted at the end of a spring pressed arm 65, is adapted to engage the notches 63 and to therefore also engage the end of the arm 58 which happens to be adjacent said notch. The arm 65 is rigidly secured to a transverse shaft 66 which extends through a bearing formed in the casing 25 and is bent outside to form an operating handle 67 positioned over the housing 10 within easy reach of the tractor operator. It is to be understood that the construction in the other half of the power lift casing is exactly the same.

In the operation of the power lift, as described, the main engine clutch is disengaged and by operating the gear shift rod 50 the gear 39 is meshed with the gear 29. The shaft 38 carrying the worm, is then continuously rotated, as well as the worm wheel 52 engaged by the worm, and the clutch members which are carried with the worm wheel. To actuate the power lift one of the levers 67 is then lifted. By this operation the roller 64 is lifted out of engagement with the notch 63. The spring 62 then rotates the actuating arm 58 until the roller 60 engages the internal notches formed in the clutch member 61. The flange 57, which carries the arm 58, the sleeve extension 54 and the crank 55 are then rotated. The spring pressed lever 65 rides around the cam portion of the flange 57 which, as will be evident by inspection of Figure 3 of the drawings, decreases in diameter as the elements are rotating in clockwise direction. After a revolution of 180° the roller 64 engages the other end of the arm 58, thereby overcoming the action of the spring 62 and disengaging the roller 60 from the notches formed in the clutch member. The arm 55 is then held stationary until the actuating lever 67 is again lifted. Although the embodiment shown utilizes a double lift independently operated power lift, only one lift need be used if it will meet the conditions for which the lift is to be utilized. In this case a substitute cover plate is provided for the cover plate 25'.

As an advantage of the construction as shown, it will be noted that the power for driving the power lift mechanism is obtained from a shaft extending rearwardly through the differential and that this drive is entirely enclosed. This is a very important feature of the invention as the parts are all self contained and lubricate automatically from the differential and transmission of the tractor. This independent enclosed drive is also another advantage over the constructions previously used. In said constructions the power takeoff shaft has been utilized for driving the power lift mechanism. In this construction the power takeoff shaft is not interfered with and may be used independently of the power lift.

The construction shown in Figure 4 is a modification in which the invention is adapted to be used with a tractor of the track laying type. These tractors usually have a large unitary casting which houses the transmission and the clutch mechanisms for selectively driving the axles which operate the chains of the tracks. As shown in Figure 4, the casting 68 represents the main casting of the track laying tractor which contains the transmission, as shown in the broken away section. The countershaft 69 of the transmission extends rearwardly and a sleeve 70, on the outer end of which a gear 71 is formed, is secured to the end of the shaft 69. The gear constitutes the means for driving the power lift from the transmission of the tractor. A shaft 72, rotatably mounted against axial movement in suitable bearings, is positioned in alignment with the shaft 69. An internally splined sleeve 73 connects the shaft 72 to an aligned shaft 74. The shaft 74 carries a worm 75 which drives a worm wheel 76 of a power lift mechanism, which may be exactly the same in construction as the corresponding portion of the mechanism previously described. To provide means for connecting the shaft 72 to the driving gear 71, a member 77 is splined on the forward end of the shaft 72. Said member has a portion which is formed internally to slide over the gear 71 to provide a driving means. This is, in fact, a positive clutch rather than a gear arrangement and any positive clutch means may be utilized. The member 77 is provided with a collar 78 which is engaged by a yoke 79. The yoke 79 is rigidly secured to a shaft 80 slidably mounted in a bearing formed as an integral part of the casting 68. A spring pressed latch 81 is provided for engaging notches formed in the shaft 80 and holding it in either of its two positions. At the rear end of the shaft 80 at one side thereof, a notch 82 is formed which is loosely engaged by the rounded end of a lever arm 83. Said lever arm is rigidly secured to a vertical shaft 84, which extends upwardly through the top of the casing, or casting 68. An actuating lever 85 is secured to said shaft.

The operation of the modification as shown in Figures 4 and 5, will be understood from the description of the elements making up said mechanism. The worm wheel 76 of the power lift is put into operation by actuation of the lever 85 while the shaft 69 is not being driven. The shaft 69 is then put into operation and the power lift may be operated at will by lifting the actuating lever 86.

It is understood that applicants have shown and described only certain or preferred forms of their improved power lift mechanism and that they claim as their invention all modifications falling within the scope of the appended claims.

What is claimed is:

1. A power lift device for tractors comprising, in combination with a tractor having a differential and rear axle housing and a transmission mounted forwardly of said housing; of an auxiliary housing secured to the rear of said housing and forming an extension thereof, a power lift mechanism mounted in said auxiliary housing, a shaft forming a part of the transmission, a second shaft in alignment with said shaft and connected thereto for rotation therewith, said second shaft extending through the differential housing into the auxiliary housing, and means for driving the power lift mechanism from said second shaft.

2. A power lift for tractors which comprises, in combination with a tractor, a casing secured to the tractor, a drive shaft mounted in said casing and adapted to be operatively connected to the tractor drive mechanism, a worm shaft rotatably mounted in said casing, gears mounted on each of said shafts, means for manually engaging said gears, a power lift mechanism of the half revolution type mounted in said casing positioned and constructed to be operated by the worm shaft, an actuating crank connected to said mechanism and extending outside the casing, and manually operable means for tripping said power lift mechanism.

3. A power lift for tractors which comprises, in combination with a tractor, a casing secured to the tractor, a driving shaft mounted in said casing and adapted to be operatively connected to the tractor drive mechanism, a driven shaft rotatably mounted in said casing, a gear slidably and non-rotatably mounted on one of said shafts, a gear connected by an overload slip clutch to the other shaft, means for manually engaging said gears, a power lift mechanism of the half revolution type mounted in said casing positioned and constructed to be operated by the driven shaft, an actuating crank connected to said mechanism and extending outside the casing, and manually operable means for tripping said power lift mechanism.

4. A power lift device for tractors comprising, in combination with a tractor having a transverse rear axle housing and transmission gearing located forwardly thereof, of a casing secured to said housing and extending rearwardly therefrom, a power lift mechanism in said casing, said mechanism including a member mounted for rotation, a driven shaft mounted for rotation in operative engagement therewith, a member having a crank arm extending through the casing, means for manually clutching said two members together, a driving shaft, power transmitting means including a gear on said shaft and a gear on the driven shaft, means for manually engaging said gears, and means for operating the driving shaft from the transmission gearing of the tractor.

5. A power lift device for tractors comprising, in combination with a tractor having a transverse rear axle housing and transmission gearing located forwardly thereof, of a casing secured to said housing and extending rearwardly therefrom, said casing being in communication with said housing whereby lubricant is supplied therefrom to the casing, a power lift mechanism in said housing, said mechanism including a worm gear mounted for rotation, a worm shaft mounted for rotation in cooperative engagement therewith, a member having a crank arm extending through the casing, and means for manually clutching the worm gear and said member together, a second shaft parallel to the worm shaft, means including a gear on said shaft and a gear on the worm shaft for driving said worm shaft, means for manually engaging said gears, and means for driving the second named shaft from the transmission gearing of the tractor.

6. A power lift device for tractors comprising, in combination with a tractor having a transverse rear axle housing and transmission gearing, including a rearwardly extending shaft, located forwardly thereof, a casing secured to said housing and extending rearwardly therefrom, said casing being in communication with said housing whereby lubricant is supplied therefrom to the casing, a power lift mechanism in said housing, said mechanism including a worm gear mounted for rotation, a worm shaft mounted for rotation in cooperative engagement therewith, a member having a crank arm extending through the casing, and means for manually clutching the worm gear and said member together, a second shaft parallel to the worm shaft, means including a gear on said shaft and a gear on the worm shaft for driving said worm shaft, means for manually engaging said gears, said second shaft being positioned in axial alignment with the shaft extending from the transmission, and means extending through the rear axle housing for connecting said shafts together.

7. A power lift for a tractor comprising, in combination with the tractor, a casing supported on the tractor, a clutch plate positioned in the casing and having a bearing portion extending therethrough, a lifting arm attached to said portion outside the casing, a clutch member rotatably mounted in said casing coaxially with the clutch plate, manually actuated means for engaging said plate and said member, means operable to automatically disengage said plate and said member after a half revolution, a worm wheel mounted for rotation with said clutch member, a worm shaft rotatably mounted in the casing in driving engagement with said wheel, a gear non-rotatably mounted on said shaft and movable axially thereof, a second shaft parallel to the first mentioned shaft, means to connect said shaft to the tractor drive mechanism, a gear rotatably mounted on said shaft, a slip clutch connecting said gear to said shaft, and means for manually engaging the gear on the worm shaft with the gear on the driving shaft.

8. A power transmitting unit adapted to be mounted over an opening in the rear end housing structure of a tractor, comprising a casing having an open side conforming to said opening and adapted to be secured to the housing structure, a shaft journaled in the casing with the end thereof extending outside the casing, and actuating means within the casing for imparting angular movement to said shaft, said means including an overload release device and having a free end presented in the opening of the casing and adapted for connection to a driving element of the tractor within its rear end housing structure.

9. The combination with a tractor having a final drive housing with an open side normally closed by a removable cover plate, a change speed transmission located at one side of the housing, and means for transmitting power from the transmission to the final drive housing; of a supplemental drive shaft driven by an element of the transmission, said shaft terminating within the final drive housing, an auxiliary housing secured to the final drive housing in lieu of the cover plate, power lift mechanism contained in said auxiliary housing and including a lifting shaft, and a separable power transmitting coupling between the free end of the supplemental drive shaft and the power lift mechanism.

10. The combination with a tractor having a rear axle housing enlarged at its central portion and formed with an opening at the rear thereof normally closed by a removable cover plate, a change speed transmission located forwardly of the housing and means for transmitting power from the transmission into the housing; of a supplemental drive shaft connected to the transmission and extending into the enlarged central portion of the housing, an auxiliary housing secured to the axle housing over the opening thereof in lieu of the cover plate, a power lift mechanism contained in said auxiliary housing and including a lifting shaft, and power transmitting connections between the supplemental drive shaft and the power lift mechanism.

11. The combination with a tractor having a rear axle housing enlarged at its central portion and formed with an opening at the rear thereof normally closed by a removable cover plate, a change speed transmission located forwardly of the housing and means for transmitting power from the transmission into the housing; of a supplemental drive shaft operatively connected to the transmission and extending into the enlarged central portion of the housing towards the open side thereof, an auxiliary housing secured to the axle housing over the opening thereof in lieu of the cover plate, a power lift mechanism contained in said auxiliary housing and including a lifting shaft, and an actuating shaft separably connected to the free end of the supplemental drive shaft and extending into the auxiliary housing for operating said power lift mechanism.

12. The combination of a tractor having a rear centrally located housing formed with an opening at the rear thereof, a supplemental drive shaft within said centrally located housing, an auxiliary casing secured to the rear of said centrally located housing over said opening and forming an extension of the housing, a power lift mechanism mounted in said casing and driven by the supplemental shaft including driving means for changing the constant rotary motion of the supplemental drive shaft to intermittent raising and lowering motion, and an overload release means in the driving means, whereby upon the operation of the power lift mechanism, if abnormal resistance is encountered, the power lift mechanism may become inactive.

13. The combination with a tractor having a rear axle housing containing axle drive mechanism and provided with an enlarged center portion formed with an opening and a transmission housing located forwardly of said center portion and containing a transmission connected to the axle drive mechanism; of a drive shaft enclosed within the transmission and axle housings and connected to the transmission to be driven thereby independently of the axle drive mechanism, a power lift casing secured to said housing over the opening formed therein, power lift mechanism mounted in said casing, and means within the axle housing for connecting the drive shaft to the power lift mechanism for operating said lift mechanism.

ALEXUS C. LINDGREN.
DAVID B. BAKER.